(12) United States Patent
Kaufman et al.

(10) Patent No.: US 12,458,557 B2
(45) Date of Patent: Nov. 4, 2025

(54) MOBILITY DEVICES

(71) Applicant: Thought Forward Design, Inc., New York, NY (US)

(72) Inventors: Henry R. Kaufman, New York, NY (US); Barry Wolfenson, Philadelphia, PA (US); Paolo Trevisan, Key Biscayne, FL (US); Stefano Luppi, Mt Vernon, NY (US); Artur Tchoukanov, Miami, FL (US); Thomas Le, Miami, FL (US); Francisco Barboza, Miami, FL (US)

(73) Assignee: Thought Forward Design, Inc., New York, NY (US)

( * ) Notice: Subject to any disclaimer, the term of this patent is extended or adjusted under 35 U.S.C. 154(b) by 316 days.

(21) Appl. No.: 18/026,640

(22) PCT Filed: Feb. 4, 2022

(86) PCT No.: PCT/US2022/015167
§ 371 (c)(1),
(2) Date: Mar. 16, 2023

(87) PCT Pub. No.: WO2022/170010
PCT Pub. Date: Aug. 11, 2022

(65) Prior Publication Data
US 2024/0009063 A1    Jan. 11, 2024

Related U.S. Application Data

(60) Provisional application No. 63/146,393, filed on Feb. 5, 2021.

(51) Int. Cl.
*A61H 3/04* (2006.01)

(52) U.S. Cl.
CPC ....... *A61H 3/04* (2013.01); *A61H 2201/0161* (2013.01); *A61H 2201/0192* (2013.01);
(Continued)

(58) Field of Classification Search
CPC .............. A61H 3/04; A61H 2201/0161; A61H 2201/0192; A61H 2201/1238
See application file for complete search history.

(56) References Cited

U.S. PATENT DOCUMENTS 4,510,956 A    4/1985  King
5,020,560 A *  6/1991  Turbeville ............... A61H 3/04
                                                    280/282
(Continued)

FOREIGN PATENT DOCUMENTS

CN      107773391 A1    3/2018
CN      211733715 U    10/2020
(Continued)

OTHER PUBLICATIONS

Supplemental European Search Report, European Patent Office, EP 22 75 0412, Nov. 16, 2024.
(Continued)

*Primary Examiner* — Erez Gurari
(74) *Attorney, Agent, or Firm* — Dorf Nelson & Zaudere LLP; Scott D. Locke, Esq.

(57) ABSTRACT

Walkers to assist movement of a person through spaces of varying dimensions are provided. Users may easily adjust the width of the devices to enable them to travel through narrow passageways such as aisles in airplanes. Users may also easily store these devices in small spaces through mechanisms that allow for collapsing of the walkers.

20 Claims, 10 Drawing Sheets

(52) U.S. Cl.
CPC ............... *A61H 2201/1238* (2013.01); *A61H 2201/5043* (2013.01); *A61H 2201/5058* (2013.01)

(56) References Cited

U.S. PATENT DOCUMENTS

| | | | | |
|---|---|---|---|---|
| 5,060,967 | A * | 10/1991 | Hulterstrum | A61G 5/0833 297/331 |
| 5,076,390 | A | 12/1991 | Haskins | |
| 5,224,717 | A * | 7/1993 | Lowen | A61H 3/04 135/73 |
| 5,301,970 | A * | 4/1994 | Haskins | A61G 5/1083 280/250.1 |
| 5,526,894 | A * | 6/1996 | Wang | B62B 1/045 280/646 |
| 5,538,268 | A | 7/1996 | Miller | |
| 6,003,532 | A * | 12/1999 | Pi | A61H 3/04 135/84 |
| 6,079,718 | A * | 6/2000 | Liao | B62B 1/042 280/DIG. 6 |
| 6,296,260 | B1 * | 10/2001 | Schiavone | B62B 1/002 280/DIG. 6 |
| 6,698,789 | B2 * | 3/2004 | Reimers | A63B 55/57 280/654 |
| 6,983,915 | B2 * | 1/2006 | Adelman | F16M 11/245 248/188.7 |
| 7,137,644 | B2 * | 11/2006 | Kimberley | A63B 55/60 280/654 |
| 7,373,942 | B1 | 5/2008 | Yeager | |
| D636,709 | S * | 4/2011 | Cho | D12/130 |
| 8,251,079 | B1 * | 8/2012 | Lutz | A63B 21/0004 135/67 |
| 8,480,098 | B2 * | 7/2013 | Liao | B62B 3/02 280/47.28 |
| 8,695,616 | B2 | 4/2014 | Huggins | |
| D791,937 | S * | 7/2017 | Schoenig | D24/128 |
| 9,775,753 | B2 | 10/2017 | Johnson et al. | |
| 9,913,772 | B2 | 3/2018 | Johnson et al. | |
| 10,080,701 | B1 | 9/2018 | Bagheri | |
| 10,111,803 | B2 | 10/2018 | Julian et al. | |
| 10,391,018 | B1 | 8/2019 | Fitzwater | |
| 10,470,966 | B1 * | 11/2019 | Smith Swerdlow | A61H 1/00 |
| 10,689,017 | B2 * | 6/2020 | McCann, Jr. | B62B 1/24 |
| 10,786,420 | B2 | 9/2020 | FitzPatrick et al. | |
| 11,779,506 | B1 * | 10/2023 | Liu | A61H 3/04 135/67 |
| 2003/0221715 | A1 * | 12/2003 | Fink | A61H 3/04 135/67 |
| 2005/0250624 | A1 * | 11/2005 | Yu | A61H 3/008 482/69 |
| 2007/0216122 | A1 * | 9/2007 | Cornelius | A61H 3/04 280/87.05 |
| 2011/0226296 | A1 | 9/2011 | Huggins | |
| 2013/0168931 | A1 | 7/2013 | Baraitaru | |
| 2014/0265256 | A1 * | 9/2014 | Rothstein | B62B 5/0466 280/651 |
| 2014/0341687 | A1 | 11/2014 | Johnson et al. | |
| 2015/0136190 | A1 | 5/2015 | Thomas | |
| 2016/0157951 | A1 * | 6/2016 | Schoenig | F16M 11/38 280/47.35 |
| 2017/0156960 | A1 | 6/2017 | Johnson et al. | |
| 2017/0209319 | A1 * | 7/2017 | Fawcett | A61G 5/125 |
| 2018/0193214 | A1 | 7/2018 | Johnson et al. | |
| 2018/0242888 | A1 * | 8/2018 | Schmutzer | G01C 22/00 |
| 2019/0298602 | A1 | 10/2019 | FitzPatrick et al. | |
| 2020/0000673 | A1 * | 1/2020 | Morgan | A61H 3/04 |
| 2020/0317168 | A1 * | 10/2020 | Mahathalagalage | B60T 1/062 |
| 2020/0352816 | A1 * | 11/2020 | Lu | A61H 3/04 |
| 2022/0047445 | A1 * | 2/2022 | Van Varick | A61H 3/04 |
| 2022/0331191 | A1 * | 10/2022 | Mcardle | A61H 3/008 |
| 2023/0121597 | A1 * | 4/2023 | Lamb | B60B 33/0002 135/67 |
| 2023/0218470 | A1 * | 7/2023 | Cumella | A61H 3/04 297/6 |
| 2024/0009063 | A1 * | 1/2024 | Kaufman | A61H 3/04 |

FOREIGN PATENT DOCUMENTS

| | | |
|---|---|---|
| DE | 102011084236 A1 | 4/2013 |
| WO | 2014089444 A1 | 6/2014 |
| WO | 2014186792 A1 | 11/2014 |
| WO | 2020/223819 A1 | 11/2020 |
| WO | 2022036327 A1 | 2/2022 |
| WO | 2022170010 A2 | 8/2022 |

OTHER PUBLICATIONS

WIPO, International Search Report, PCT/US22/15167, mailed Nov. 23, 2022.
WIPO, Written Opinion, PCT/US22/15167, mailed Nov. 23, 2022.

* cited by examiner

MOBILITY DEVICES

CROSS-REFERENCE TO RELATED APPLICATION

This application is a national stage application of PCT/US2022/015167, filed Feb. 4, 2022, which claims the benefit of the filing date of U.S. Provisional Application Ser. No. 63/146,393, filed Feb. 5, 2021, the entire disclosure of which is incorporated by reference as if set forth fully herein.

FIELD OF THE INVENTION

The present invention relates to the field of devices that facilitate walking.

BACKGROUND OF THE INVENTION

Many people use walkers in order to facilitate movement. In order to make walkers functional, designers of them have traditionally focused on balancing the weight of a device with the strength of the device in order to allow individuals to be as independent as possible while using them. One solution has been to use tubular frames that may, for example, be made of aluminum. Often these frames are configured with two side supports and a front lateral portion that connects the two side supports, thereby defining a cavity in which a person can stand when using the device. Additionally, in order to balance ease of movement with stability, designers have equipped many of these walkers with a wheel on the lower end of each of two front legs and a stopper that may, for example, be made of plastic or rubber, at the lower end of each of two rear legs. In other walkers, designers have used stoppers on the bottom of all legs and not included wheels.

A user of these types of walkers may lean on the side supports while standing, and when the user wishes to move, the user may lift or slide the rear legs while applying a force forward. In response to the force, the wheels, when present, will roll forward. This basic type of walker is often satisfactory when a user is in a wide open space or in a sparsely populated large room.

However, traditionally used walkers suffer from at least two drawbacks. First, most of these walkers are rigid with respect to their width. Thus, they are one-size fits all with respect to both the size of the user and the spaces that may be navigated while using them. Additionally, for both reasons of stability and enjoyment of personal space, many users would prefer to maintain a certain footprint when using a walker. However, users also appreciate that not all environments are conducive to maintaining that footprint. An example of an environment that requires a walker to be of a footprint that is smaller than a user typically would select is an aisle of an airplane or a train.

Second, commonly used walkers are not easily stored. In some known walkers, the side supports may fold inward. However, even when folded, the dimensions of these walkers remain large. Therefore, users must find a sufficiently large space in which to store these devices when not using them. This can be particularly difficult when traveling. Thus, there is a need for new designs of walkers.

SUMMARY OF THE INVENTION

The present invention provides new and non-obvious mobility devices e.g., walkers, as well as methods for using these devices. Through the use of various embodiments of the present invention, a user may navigate spaces of different dimensions and/or easily store his or her walker when space is limited. These walkers are particularly advantageous when moving through narrow passages such as aisles on airplanes and trains. Additionally, some embodiments of the present invention are advantageous when storage is limited.

According to a first embodiment, the present invention provides a walker comprising: (a) a first side support member, wherein the first side support member forms a first forward leg and a first rear leg; (b) a second side support member, wherein the second side support member forms a second forward leg and a second rear leg; (c) a first wheel, wherein the first wheel is attached to the first forward leg; (d) a second wheel, wherein the second wheel is attached to the second forward leg; (e) a lateral member, wherein the lateral member connects the first side support member and the second side support member, wherein each of the first forward leg, the first rear leg, the second forward leg, and the second rear leg are collapsible and wherein the lateral member is adjustable between a plurality of positions, wherein when in a first position, the first side support member and the second side support member are a first distance apart and wherein when in a second position, the first side support member and the second side support members are a second distance apart, wherein the first distance is greater than the second distance.

When in use, this device may, for example, be adjustable in width from 10 inches to 30 inches or from 12 inches to 28 inches or from 14 inches to 26 inches or from 15 inches to 25 inches. This device may, for example, be adjustable in height from 28 inches to 42 inches or from 30 inches to 40 inches or from 32 inches to 38 inches. In some embodiments, when in use, the depth is from 16 to 24 inches or from 18 to 22 inches or from 19 to 21 inches. In some embodiments, when this device is collapsed for storage, it may, for example, have dimensions of 18-22 inches×11-15 inches× 13-17 inches, e.g., 19.2 inches×13.5 inches×15 inches (height×width×depth).

According to a second embodiment, the present invention provides a walker comprising: (a) a vertical member; (b) a first wheel; (c) a second wheel; (d) handles; (e) a first connector system, wherein the first connector system connects the first wheel and the vertical member; (f) a second connector system, wherein the second connector system connects the second wheel and the vertical member; (g) a height adjustment system, wherein the height adjustment system is capable of causing the vertical member to move between a plurality of vertical positions; and (h) a width adjustment system, wherein the width adjustment system is capable of causing a distance between the first wheel and the second wheel to adjust between a plurality of positions.

In some embodiments, this device may be adjustable in width from 10 inches to 30 inches or from 12 inches to 28 inches or from 14 inches to 26 inches or from 15 inches to 25 inches. In some embodiments, when not collapsed, this device may be adjustable in height, from 28 inches to 42 inches or from 30 inches to 40 inches or from 32 inches to 38 inches. In some embodiments, when in use, the depth is 24 to 30 inches or 25 to 29 inches or 26 to 28 inches. In some embodiments, when this device is collapsed for storage, it may have dimensions of 28-32 inches×13-17 inches×8-10 inches×, e.g., 30 inches×15 inches×9.5 inches (height× width×depth).

According to a third embodiment, the present invention provides a walker with first and second side support members and a lateral member of other embodiments, wherein when the walker is in a first position, the first side support member is at least substantially parallel to the second side support member and in a second position, the first side support member is at least substantially parallel to the second side support member. In some embodiments, the walker is capable of existing in a third position, wherein the third position is a collapsed position, wherein the height of the walker in the third position is smaller than the height of the walker in the first position and/or second position (which may be the same or different heights) and wherein when in the third position, the first side support member is at least substantially parallel to the second support member.

According to a fourth embodiment, the present invention provides a method of navigating a space. The method comprises causing a walker of any of the embodiments of the present invention to move between a first position and the second position, wherein in the first position the walker has a first width and in the second position, the walker has a second width that is different from the first width. In each of the first position and the second position, the walker may be used to assist a person with his or her mobility.

Through the use of various embodiments of the present invention, persons can easily navigate narrow spaces and thus have greater independence. Additionally, in some embodiments, users may readily and easily be able to store their devices, thereby making users more likely, for example, to travel with these devices.

DETAILED DESCRIPTION OF THE INVENTION

Reference will now be made in detail to various embodiments of the present invention, examples of which are illustrated in the accompanying figures. In the following description, numerous specific details are set forth in order to provide a thorough understanding of the present invention. However, unless otherwise indicated or implicit from context, the details are intended to be examples and should not be deemed to limit the scope of the invention in any way. Additionally, features described in connection with the various or specific embodiments are not to be construed as not appropriate for use in connection with other embodiments disclosed herein unless such exclusivity is explicitly stated or implicit from context.

Headers are provided herein for the convenience of the reader and do not limit the scope of any of the embodiments disclosed herein.

Discussion

According to a first embodiment, the present invention provides a walker that comprises, consists essentially of, or consists of a first side support member, a second side support member, a first wheel, a second wheel, and a lateral member.

Side Support Members

In the first embodiment, there are: (1) a first side support member 110; and (2) and a second side support member 111. When a user is standing or moving, the user puts his or her weight on the side support members, one of which is on the user's right side and the other of which is on the user's left side. Each side support member forms a forward leg 180, 181 and a rear leg 190, 191. The legs may be formed by connecting structures such as tubes or by bending or molding or single structure such as a tube. In some embodiments, when in use, the first side support member and the second side support member are substantially parallel to each other or are parallel to each other. In some embodiments, when being stored, the first side support member and the second side support member are substantially parallel to each other or are parallel to each other.

When the device is in use, the forward and rear legs may extend vertically or substantially vertically toward the floor. In some embodiments, when the device is in use, each front leg forms an angle of 60 to 90 degrees or 65 to 85 degrees or 70 to 80 degrees with the floor while the remainder of the support members above the front legs are perpendicular or substantially perpendicular to the floor. In some embodiments, when the device is in use, each rear leg forms an angle of 90 to 135 degrees or 95 to 115 degrees or 110 to 120 degrees with the floor while the remainder of the support members above the front legs are perpendicular or substantially perpendicular to the floor. Thus, unless the front leg and the rear leg are both 90 degrees relative to the floor, they are not parallel to each other and one may angle toward the other or each may angle toward the other as they move away from the floor. In some embodiments, the angles of the front leg and the rear leg are relative to a vertical plane perpendicular to the side support members, and the legs remain within or substantially within the planes of the side support members.

In some embodiments, each front leg forms a constant angle relative to the floor until it reaches the point where it transitions to (or is attached to) an upper support region of the side support member and each rear leg forms a constant angle relative to the floor until it reaches the point where it transitions to (or is attached to) the upper support region. Alternatively, one or both of each front leg and/or rear leg forms a first angle relative to the floor when in use and a second angle as one moves away from the floor. This second angle may, for example, in the case of the front leg be greater relative to the floor, by for example, 1 to 30 degrees or 5 to 20 degrees and in the case of the rear leg, smaller, by for example, 1 to 30 degrees or to 20 degrees in each case signaling that an upper region is closer to 90 degrees than the lower region of the same leg when the angle for the given leg is not constant. By way of a non-limiting example, when the device is in use, each front leg may form a constant angle relative to the floor while a first (also referred to as lower) region of each rear leg forms a first angle relative to the floor and a second (also referred to as an upper) region, which is distal to the floor forms a smaller angle (closer to ninety degrees) relative to the floor. In some embodiments, within each side support member, the front leg and rear leg are not parallel to each other and are farthest from each other at their locations closest to the floor (i.e., the farthest that they are from the upper member).

At the lower end of the front legs are wheels 140, 141. In some embodiments, the wheels are solid, while in other embodiments they are donut shaped. Additionally, they may be rimmed or rimless. Further, optionally, the wheels have tires or a rubber exterior.

The side support members may be hollow tubes or partially or completely solid. If the side support members are hollow in whole or in part, at the lower end of each rear leg there may, for example, be a stopper or another structure that closes the tube that forms the rear leg and/or adds friction. This material may, for example, comprise, consist essentially of, or consist of a material such as rubber or plastic or a combination thereof 195, 196. In some embodiments there is an absence of wheels at the lower end of the rear legs, while in other embodiments there is a wheel at the bottom of each rear leg, in which case the walker may also be referred to as a rollator. When a wheel is present, optionally it contains a locking mechanism such as a foot activated locking mechanism.

Within each side support member is an upper connector region 100, 101. The upper connector region joins the front leg and the rear leg. When the device is in use, the upper connector region may be parallel or substantially parallel to the ground. Also, the transition between the upper connector region and each of the front leg and the rear leg may be curved (rounded) or a right angle.

Optionally, each side support member contains a lower connector region that connects each front leg and rear leg 150, 151. In some embodiments, each lower connector region is substantially parallel to the upper connector region of the respective side support member. Persons of ordinary skill in the art will recognize that although each of the forward leg, rear leg, upper connector region and lower connector region are described separately, there may be seamless or seamed transitions between the connector regions and the legs. Additionally, although described herein as a region within the side support members, one or both of the lower connector regions and one or both of the upper connector regions can instead be separate structures that are associated with the legs through fasteners or by welding.

In some embodiments, the upper connector regions are textured to allow a user to maintain his or her grip more easily. In other embodiments, there may be a cover over part or all of each upper connector region. Optionally the covers may extend over part of one or both of the front leg and rear leg. In some embodiments, the cover comprises, consists essentially of, or consists of leather 115, 116.

In some embodiments, each of the first forward leg, the first rear leg, the second forward leg, and the second rear leg are collapsible. As used herein each leg is "collapsible" if by each leg can be moved from an in use state to a collapsed state by pivoting, folding, or otherwise being shifted so that the distance from the top of the device to the surface on which the device rests becomes smaller Thus, the height of the device decrease. In some embodiments, there are pivot mechanisms in each of the first forward leg, the first rear leg, the second forward leg, and the second rear leg 170, 171, 174, and 172.

If a lower connector member is present, there may be a first forward pivot mechanism between a first lower connector region and the first wheel, a second forward pivot mechanism between a second lower connector region and the second wheel, a first rear pivot mechanism between the first lower connector region and the lower terminus of the first rear leg, and a second rear pivot mechanism between the second lower connector region and the lower terminus of the second rear leg.

Examples of pivot mechanisms include but are not limited to hinges. Pivot mechanisms allow one element to rotate partially or completely around or relative to a another. In some embodiments, the pivot mechanism allows for rotation between zero and one hundred and eighty degrees. In some embodiments, the pivot mechanism comprises a hinge.

In some embodiments, the pivot mechanism further comprises a slidable sleeve on each leg that allows the pivot to be locked and unlocked. Each of these sleeves may be independently controlled or the two sleeves on the right side may be moved together while the two sleeves on the left side may be moved together.

In some embodiments, the pivot mechanism comprises a cable connection for each leg. Each cable connection may, for example, be potentially spring loaded to release from the folded position, and optionally contain a pulley type attachment on each leg.

Additionally or alternatively, the pivot mechanism may comprise a ratchet system. In a non-limiting example of a ratchet system that may be used in connection with the present invention there is a one way ratchet to "open," which requires a user to push beyond open, thereby releasing the ratchet and to allow for closure.

Other pivot mechanisms for the legs include but are not limited to: binary closed/open positioning that is capable of rotating on a fully pinned connection on each leg; spring loaded actuating mechanisms and combinations thereof.

In some embodiments all legs rotate the same way, i.e., all clockwise or all counterclockwise. In other embodiments, one pair of the left or right legs rotates clockwise and the other pair of the left or right legs rotated counterclockwise. In other embodiments, one pair of the front or rear legs rotates clockwise and the other pair of the front or rear legs rotates counterclockwise.

If either or both of each of the front leg and the rear leg is not linear, i.e., transitions from a first angle to a second angle relative to the floor and thus contains a bend, the location of this bend or transition may be below the pivot mechanism at the pivot mechanism, above the pivot mechanism, below the lower support member, at the lower support member or above the lower support member.

Figure 2A:
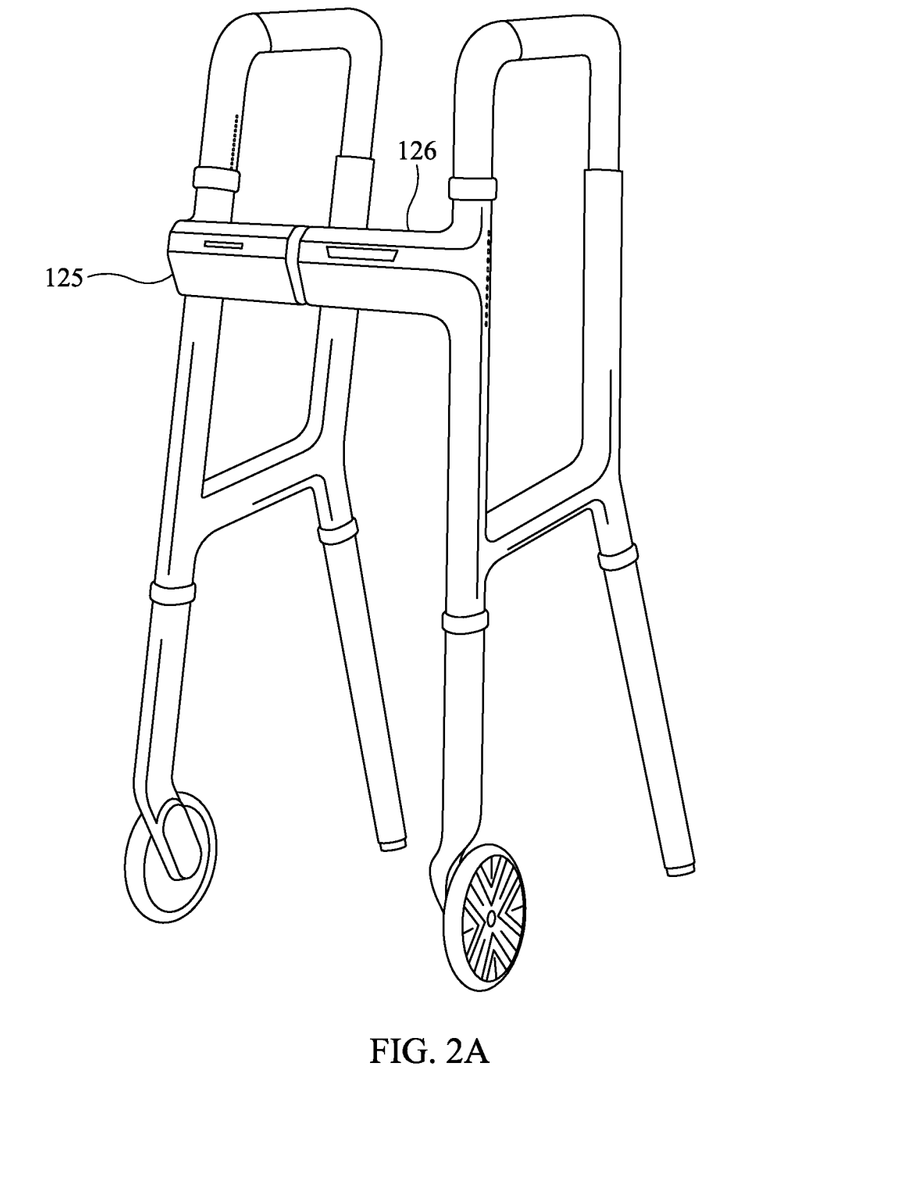
FIG. 2A is a representation of the walker of FIG. 1 in which the width has been narrowed.
Figure 2B:
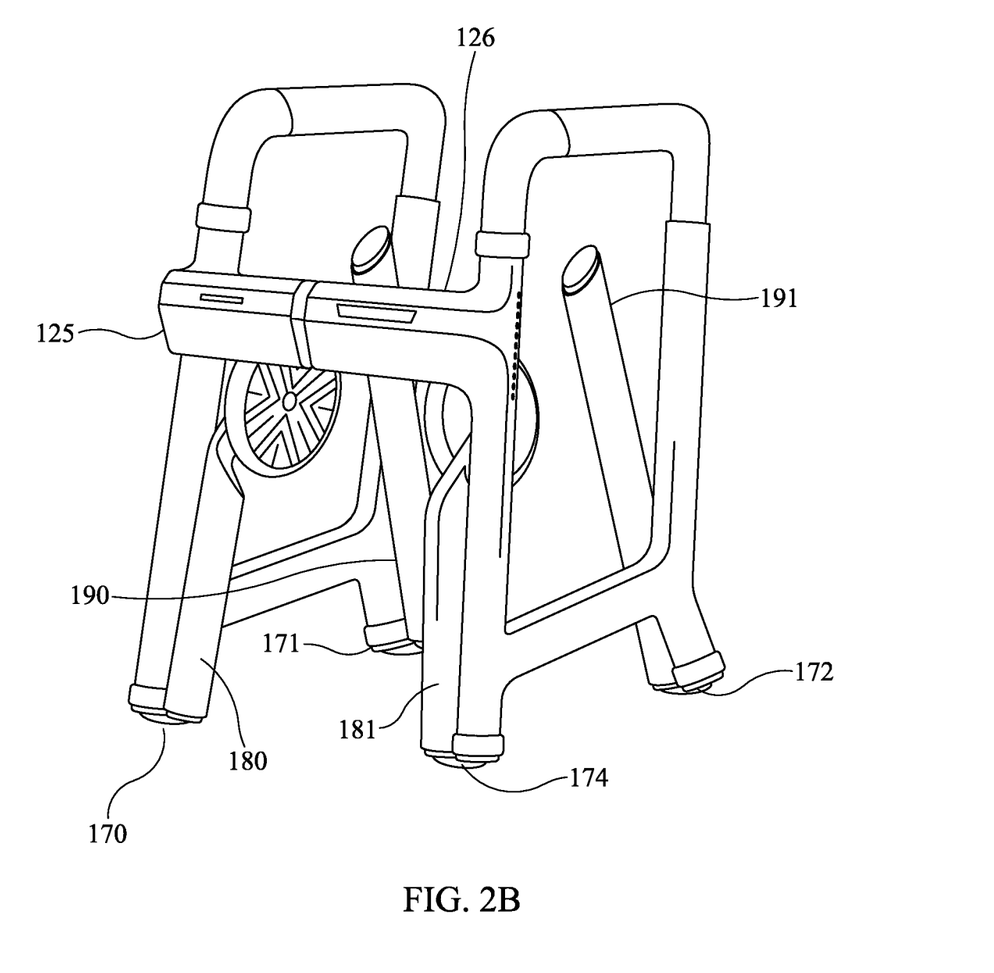
FIG. 2B is a representation of the walker of FIG. 2A in which the walker has been collapsed.

An example of use of the pivot mechanisms is shown in FIG. 2B. A lower portion of each of the first front leg 180, the first rear leg 190, the second front leg 181, and the second rear leg 191 is folded inward after use of the respective pivot mechanism. As shown in the figure, the distance from each of the four pivot mechanisms to the upper region of each side member is the same, while the distance between the front pivot mechanisms and the wheels is smaller than the distance between the rear pivot mechanisms and the lower termini of the rear legs. This is because in the device shown, when is use, the angle between the lower regions of the rear legs and the floor is farther from ninety degrees than the angle between the front legs and the floor when the device is in use. This difference may, for example, be 5 to 30 degrees or 10 to 20 degrees.

There may also be a pivot lock that may be in a locked position for each pivot mechanism when the walker is in use and/or being stored, and be in an unlocked position when transitioning from storage to in use and from in use to storage. The locking mechanism may, for example, be a push button ratchet joint, a notch joint, or slip joint.

By collapsing the legs, the device can be rendered compact and, for example, fit in an overhead bin on an airplane.

As stored, the lower portions of the legs of the two side support members are closer to each other than the upper portions are to each other, but the upper portions of the two side support members are at least substantially parallel to each other in this storage configuration and in some embodiments, substantially parallel to the lower portion of the side support members in this storage configuration.

As noted above, when the front leg and rear leg do not form the same angles relative to the floor (or the rear leg's angle is not=180 degree–[the angle that the front leg forms with the floor]), their lower regions may be different lengths. Consequently, when the device is folded, the lower regions of the front legs do not extend as high as the lower regions of the rear legs. Both of these lower regions do not extend beyond the upper connector regions. Optionally, the device may be designed such that when collapsed, the front legs do not extend as high as the lateral member while the rear legs extend higher than the lateral member.

In some embodiments, the height of the side support members is adjustable for different in use positions. Thus, in addition to being collapsible or alternatively to being collapsible for storage, the device may be height adjustable. In some embodiments, the first side support member and the second side support member may each comprise a height adjustment mechanism. By having an adjustable height option, the same device may be used by users of different heights. Each height adjustment mechanism may be, comprise, consist essentially of, or consist of a set of vertical telescoping members. In some embodiments, each height adjustment mechanism comprises a vertical locking system, wherein the vertical locking system is capable of locking each of the first side support member and the second side support member at a plurality of heights.

In some embodiments, the height adjustment mechanism, which may be located in the upper portion of each front and rear leg of each side support member, comprises two or more telescoping structures that are released and locked in place by a level or button 120. In other embodiments, the height of the side support members is controlled through the arms, which are the upper region of the side support members. For example, by rotating the arms inward or outward, a height engagement mechanism may be released, thereby allowing the user to lift a portion of the telescoped legs to a desired height. When the user rotates the arms back to the default position, the locking mechanism may reengage, thereby securing the arms at the desired height.

Regardless of where the control for the height adjustment mechanism is located, in some embodiments, all telescoping occurs in the upper portion of the legs, i.e., distal to the floor so that the lower portion of all of the legs remains a fixed length. Thus, the when the upper portion of the legs move inside of fixed down tube elements adjustment will not be in the portion of the legs proximate to the floor.

In some embodiments, the telescoping occurs only in the upper portion of the device and the device is capable of having the height varying up to 14 inches, up to 12 inches or up to 10 inches or up to 8 inches or up to 6 inches or up to 4 inches.

In some embodiments, the height adjustment system contains a locking mechanism. A non-limiting example of the locking system is a system comprising, consisting essentially of, or consisting of push button detents to lock and unlock.

In some embodiments, the user provides the exclusive force for movement in the vertical direction. In other embodiments, the system is configured to allow for a gas charged assist, and comprises a cylinder for enabling a gas charged assist in each fixed leg element i.e., the portion that does not move during telescoping.

Both the height adjustment mechanism and the pivot mechanisms change the overall height of the device. However, the height adjustment mechanism is capable of being employed while the device is in use whereas the pivot mechanism is engaged when the device is being transitioned from storage to in use and back. If a height adjustment mechanism is present, optionally, when putting the device in the storage mode, one may first use the height adjustment mechanism to lower the arms.

Lateral Member

Between the first side support member and the second side support member is a lateral member 127. The lateral member is capable of defining a plurality of distances. By way of a non-limiting example, the lateral member may be part of a width adjustment system that has two or more horizontal telescoping members that telescope from one or both ends. In some embodiments, the horizontal width adjustment system comprises an inner lateral member, a first outer lateral member, and a second outer lateral member, wherein the first outer lateral member is attached to or part of the first forward leg and the second outer lateral member is attached to or part of the second forward leg.

Figure 1:
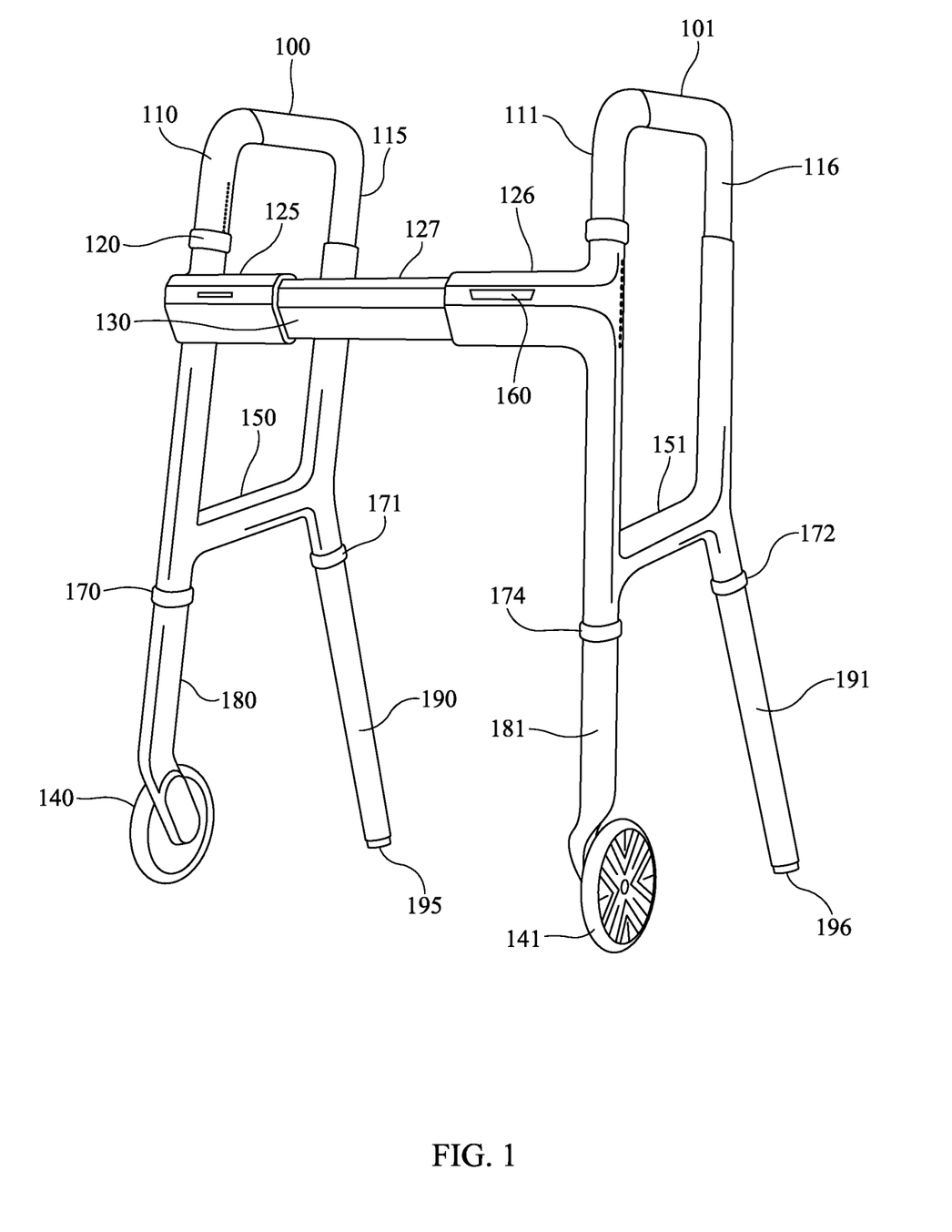
FIG. 1 is a walker of the present invention.

As shown in FIG. 1, there is an inner lateral member 130 and two outer lateral members 125 and 126. In FIG. 2A, the side support members have been moved closer together, thereby narrowing the width of the device and hiding the inner lateral member within the first outer lateral member 125, and the second outer lateral member 126. Although the figure shows an inner member that is telescoped from both sides, within the scope of the invention is a mechanism for telescoping from only one side.

The lateral member is adjustable between a plurality of positions, wherein when in a first position, the first side support member and the second side support member are a first distance apart and wherein when in a second position, the first side support member and the second side support members are a second distance apart, wherein the first distance is greater than the second distance. When moving from the first position to the second position the entire side support members move closer together.

The mechanism for horizontal movement may be designed in a number of ways, including but not limited to having detents for a lock or a cam type lock controlled by a single lever; a horizontal locking system that comprises a pin and a plurality of holes; a ratchet system; a rack and pinion system that allows for rolling adjustment; a sliding or rolling design that comprises a tube in tube system; and two rectangles that allow for telescoping, and combinations thereof.

In some embodiments, the width of the walker is controlled through the arms, which are the upper regions of the side support member. For example, by rotating the arms inward or outward, a width engagement mechanism may be released, thereby allowing the user to pull apart or push together the side support members. When the user rotates the arms back to the default position, the locking mechanism may reengage thereby securing the arms at the desired width. One or both of the width and height may be controlled through the arms. Thus, the width may be controlled by rotation in one direction (inward or outward) and the height may be controlled by rotating the arms in the other direction. These two control features (height and width) may be located at the same or different parts of one or both of the arms. Additionally, each may be on one arm or either or both may be on both arms.

Alternative to controlling the width through rotation of the arms, the device may be equipped with a release or latch that when in a first position maintains a width at a given position and when the release or latch is in a second position allows the user to push the side support members closer together or to pull them farther apart. Either or both releases or latches may be on the upper support member or on one or both front legs or the lateral member.

Figure 3A:
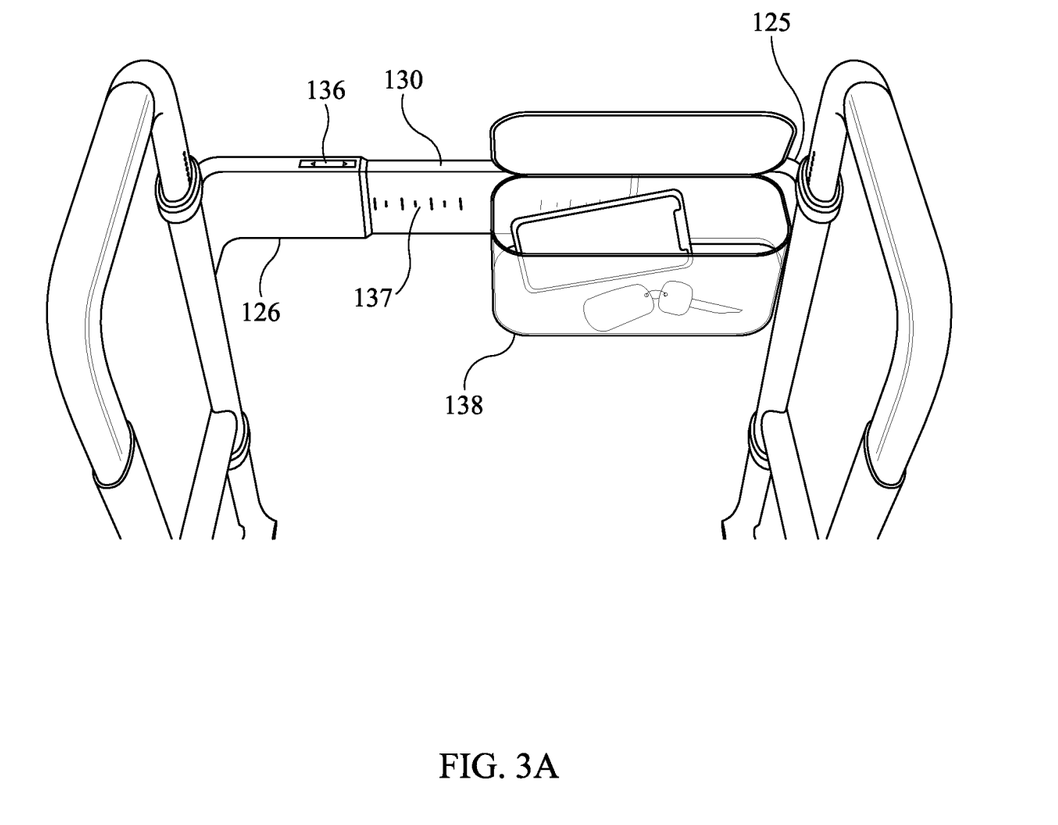
FIG. 3A is a section of a walker in which a storage compartment is shown.
Figure 3B:
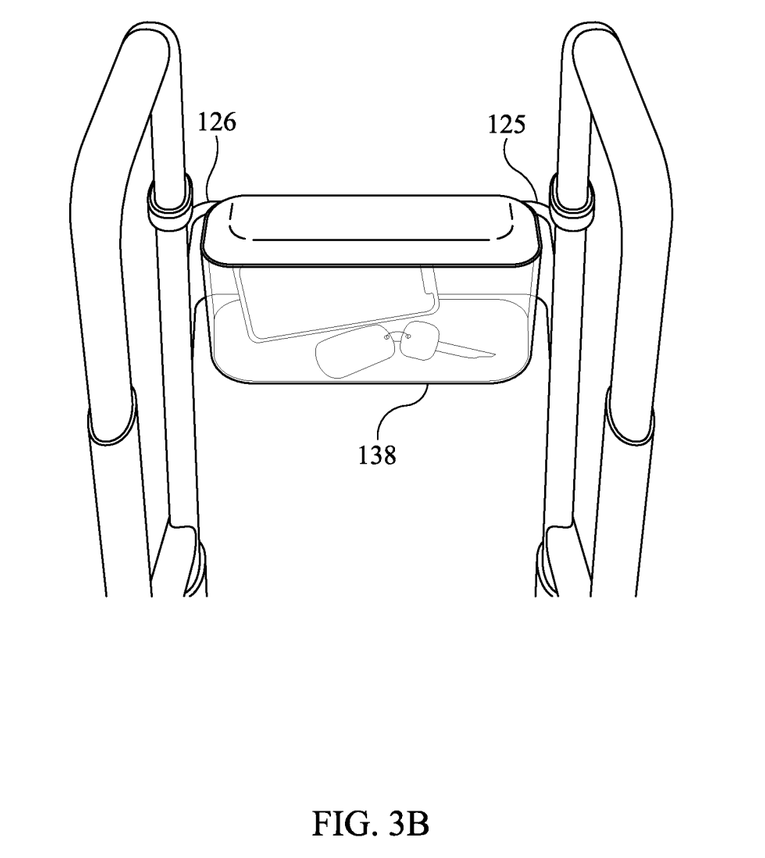
FIG. 3B is a section of a walker in which a storage compartment is shown and in which the distance between the first side support member and the second side support member is smaller than as shown in FIG. 3A.

As shown in FIGS. 3A and 3B, in some embodiments, on the inner lateral member 130 there is a release 136 that may be pressed to allow the inner latter member to slide and markings 137 that allow a user to know by how much he or she increases or decrease the width. FIG. 3A shows a portion of a walker in a first position, whereas FIG. 3B shows a portion of the walker in a second position.

Optionally one or both of the outer members comprises a light, such as a headlight 160 in FIG. 1. The light may be battery operated and controllable by a switch (not shown) that is located on an inner side of a lateral member. Additionally or alternatively, the light may be associated with a sensor that determines whether light is needed, and the sensor activates the light as needed.

Smart Walkers

In some embodiments, the walker is capable of determining the width of a passage that the user is going to enter. In these devices, there may be one or more of a sensor, a camera, a sonar device, or a radar device that detects the width of a passageway immediately in front of or 1 to 20 feet in front of or 5 to 10 feet in front of the user. This information may be relayed to a computing device within the walker or to a user's smartphone that determines if the current configuration of the device is narrow enough to fit through an upcoming space.

The device may be set up to narrow the distance between the support members automatically if they are too wide apart. Additionally or alternatively, the system may be configured to alert the user by, for example, a text message or sound on his or her smartphone or on the device itself or a flashing light that adjustment in size is recommended.

If the device is configured to adjust automatically, then within or associated with the lateral member are the electronic circuitry and mechanical structures such as gears to cause automatic adjustment to an appropriate size.

Storage Compartment

In some embodiments, the walker further comprises a storage compartment, wherein the storage compartment is attached to the first or second outer lateral member. The storage compartment may, for example, be a rigid, semi-rigid or flexible pouch. The storage compartment may be made of any material that is now known or that comes to be known and that a person of ordinary skill in the art would consider of use in connection with the present invention, e.g., nylon, mesh, plastic, metal and combinations thereof.

In some embodiments, and as shown in FIGS. 3A and 3B, the storage compartment 138 is on the inner side of the first outer lateral member 125 or second outer lateral member 126 and thus opens toward a user. In some embodiments, the dimension of the storage compartment that is parallel to the lateral element is less than or equal to the combined length of the first outer lateral member 125 and the second outer lateral member 126. Consequently, when the inner lateral member is fully hidden, the storage compartment is not compressed.

Rollators

Various embodiments of the present invention are described as walkers. In some of these embodiments, at the lower end of each front leg, there is a wheel and as the lower end of each rear leg there is an absence of a wheel, and there may, for example, be a stopper. In other embodiments, the lower end of each rear leg may contain a wheel, in which case the walker may also be termed a rollator.

In some embodiments, the wheels on the front legs and/or on the rear legs are removable. For example, in some embodiments, a lower end of the rear legs contain a removable cap and/or lower portion that when removed reveal a male or female coupling structure or screw threads. The wheels to be attached may be equipped with a structure that is complementary to the male or female coupling structure or screw threads.

Gas Struts and Bowden Cables

According to another embodiment, the present invention is directed to the use of a gas struts and Bowden cables in a walker that is width adjustable and optionally collapsible. In this embodiment, the walker comprises a vertical member, a first wheel, a second wheel, handles, a first connector system, a second connector system, and optionally a first extension element, and a second extension element.

Vertical Member

Figure 4:
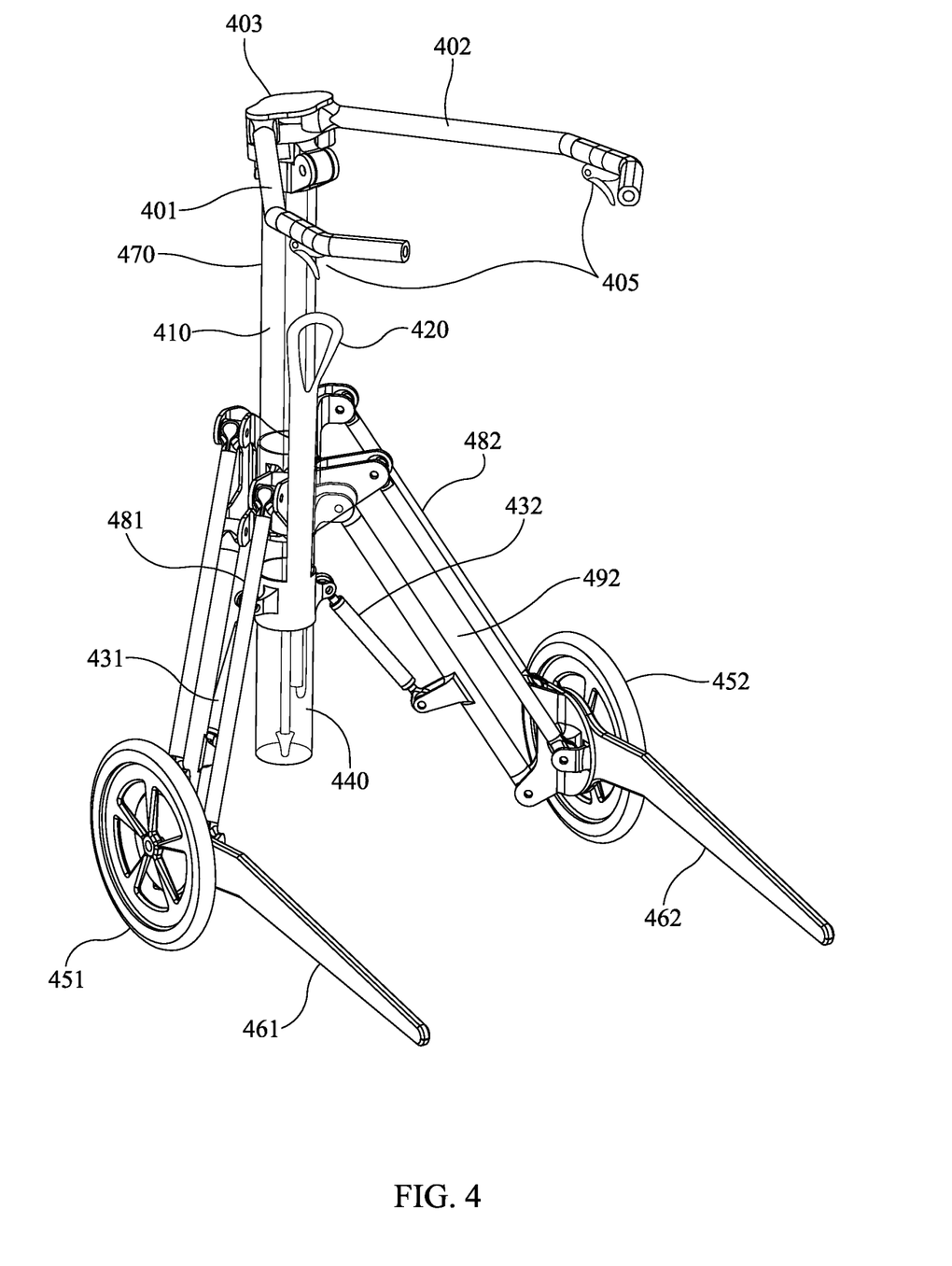
FIG. 4 is a walker of another embodiment of the present invention.

In one embodiment, as shown in FIG. 4, there is a vertical member 470. When this walker is in use, the vertical member is in front of the user. Associated with the vertical member may be a height adjustment system, wherein the height adjustment system is capable of causing the vertical member to move between a plurality of vertical positions. Optionally, the vertical member has markings, 419 of FIG. 6, that indicate the height of the walker (either objectively such as in feet/inches or meters/centimeters or relative to the various other possible heights of the walker) and that are visible by the user.

Associated with the vertical member is a width adjustment system that is capable of causing a distance between the first wheel and the second wheel to adjust between a plurality of positions. In some embodiments, the width adjustment system comprises a width adjustment Bowden cable. Attached to the vertical member is a width adjustment grab handle 420 and a width expansion foot pad 492. Within the vertical member is the width adjustment gas strut 440 and the height adjustment gas strut 410.

In some embodiments, the width adjustment system comprises a width adjustment gas strut and a width adjustment foot pad. These structures may work cooperatively or complementarily to adjust the width of the walker. When the width of the walker is adjusted, the overall foot print changes because the widest parts, the wheels, move closer or farther apart.

Figure 6:
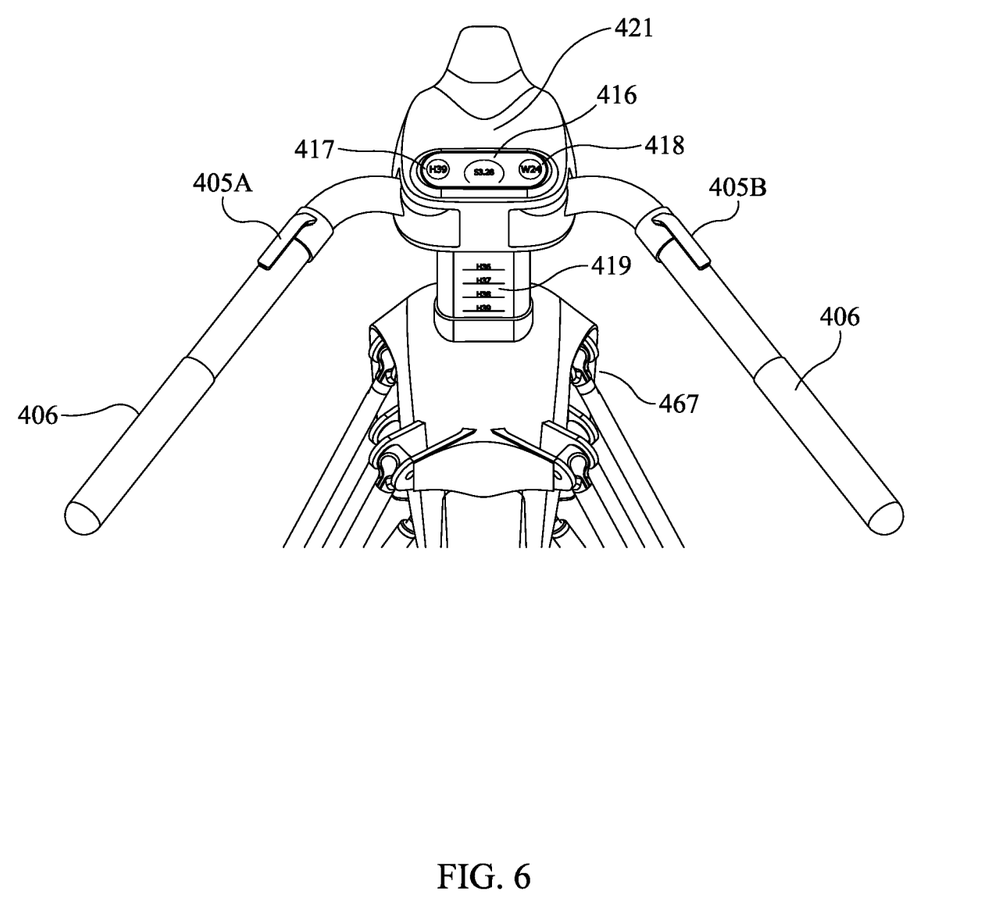
FIG. 6 is a section of a walker in which a digital display is shown.

The vertical member may comprise one or more tubes within a housing, 467 of FIG. 6. In some embodiments, it is the housing to which other components are attached and through which other components are thread. In some embodiments, the vertical member comprises, consists essentially of, or consists of a metal such as aluminum, plastic, fiberglass or combinations thereof.

Examples of mechanisms for controlling vertical movement include but are not limited to shock Down Tubes such as those commonly used in office chairs; air suspension assists, similar to hatch struts on cars; and ratchets to control descent with the ability to lock at ratchet clicks. In one embodiment, one of elements 405A (FIG. 6) is a height adjust lever that has a cable for the gas shock trigger, while the other element 405B (FIG. 6) is a lever that controls the width of handles and allows for fining tuning based on the configuration centered at a connection point in 403.

In some embodiments, the height adjustment mechanism allows a user to stop anywhere between a maximum and minimum height. In other embodiments, the device allows the user to stop only a finite number of predetermined locations.

In some embodiments, the device contains a display that provides information about the device's height. The information may be relative, e.g., on a scale of 1 to 10 or 1 to 100, or it may be absolute and provide information in inches and/or centimeters.

Handles

Extending from the vertical member is a handlebar system 403 that contains left and right handles. Through one of the handlebars is thread a height adjustment Bowden cable 401 and through the other handlebar is thread a width adjustment Bowden cable 402. Each of the Bowden adjustment cables terminates at one end in a gas strand release handle 405 (FIG. 4) and at the other end extends through the vertical element.

In some embodiments there is one or both of a height adjustment actuator and a width adjustment actuator located on the handles. By way of non-limiting examples, the actuators may be switches or buttons in effective communication with the Bowden cables and/struts as necessary to cause adjustments in height and or width. In some embodiments, the height adjustment system comprises one or more of a height adjustment Bowden cable, a height adjustment gas strut and a height actuator, wherein the height actuator is located on the handles.

Optionally, the handlebar system 421 comprises a digital display, which can be seen in FIG. 6. The digital display may, for example, be a graphic user interface. In some embodiments, the walker comprises a pedometer and the digital display is capable of displaying information collected by the pedometer 416 as well as displaying the height 417 and width 418 of the walker. In some embodiments the digital display is capable of being in wired or wireless communication with a smartphone.

For reference, also shown in FIG. 6 are the height release actuator 405A and the width release actuator 405B. These actuators can be operably coupled to the height adjustment mechanism and width adjustment mechanisms respectively.

Optionally, the handles comprise grips 406. The grips may for example, comprise, consist essentially of, or consist of leather.

Wheels

The walker as shown is FIG. 4 has a first wheel 451 and a second wheel 452. In some embodiments, the wheels are solid, while in other embodiments they are donut shaped. Further, optionally, the wheels have tires or a rubber rim. In some embodiments, the wheels have a diameter of 4 to 18 inches or 6 to 12 inches.

Connector System

Each wheel is connected to the vertical member through a connector system. Thus, the first wheel is associated with the vertical member through a first connector system and the second wheel is connected to the vertical member through a second connector system.

FIG. 4 shows an example of a connector system. Each connector system as shown has a pair of rigid elements 481 and 482 that maintain stability between the wheels and the vertical members. Rather than using a pair of these rigid elements, one could use only a single rigid element for each wheel or more than two rigid elements. In some embodiments, the length of the rigid elements is fixed, but they can slide over a range along the vertical element or its housing, thereby defining a range of widths of the walker.

Optionally, each connector system has a width expansion foot pad 431, 432. The width expansion foot pads are part of the means through which the changes in the width of the walker is accomplished.

Extension Elements

Various embodiments of the present invention also comprise extension elements that may help to define the space in which the user stands or walks and that may also further stabilize the device when in use. A first extension element 461 may be connected to the first wheel 451, and a second extension element 462 may be connected to the second wheel 461.

Each of the first extension element and the second extension element may be affixed directly or indirectly to hub of a wheel (or other structure) and when the device is in use extend rearward, parallel or substantially parallel to the floor. The extension elements may be configured such that when a user is walking, the extension elements do not touch the ground but at no point are more than 12 inches, more than 10 inches, more than 8 inches, more than 6 inches, more than 4, inches or more than 2 inches from the ground.

In some embodiments, the first extension element is connected to the first wheel at a first end of the first extension element and a second end of the first extension element extends rearward when the device is in use, and the second extension element is connected to the second wheel at a first end of the second extension element and a second end of the second extension element extends rearward when the device is in use.

Collapsibility and Width Adjustment

Figure 5A:
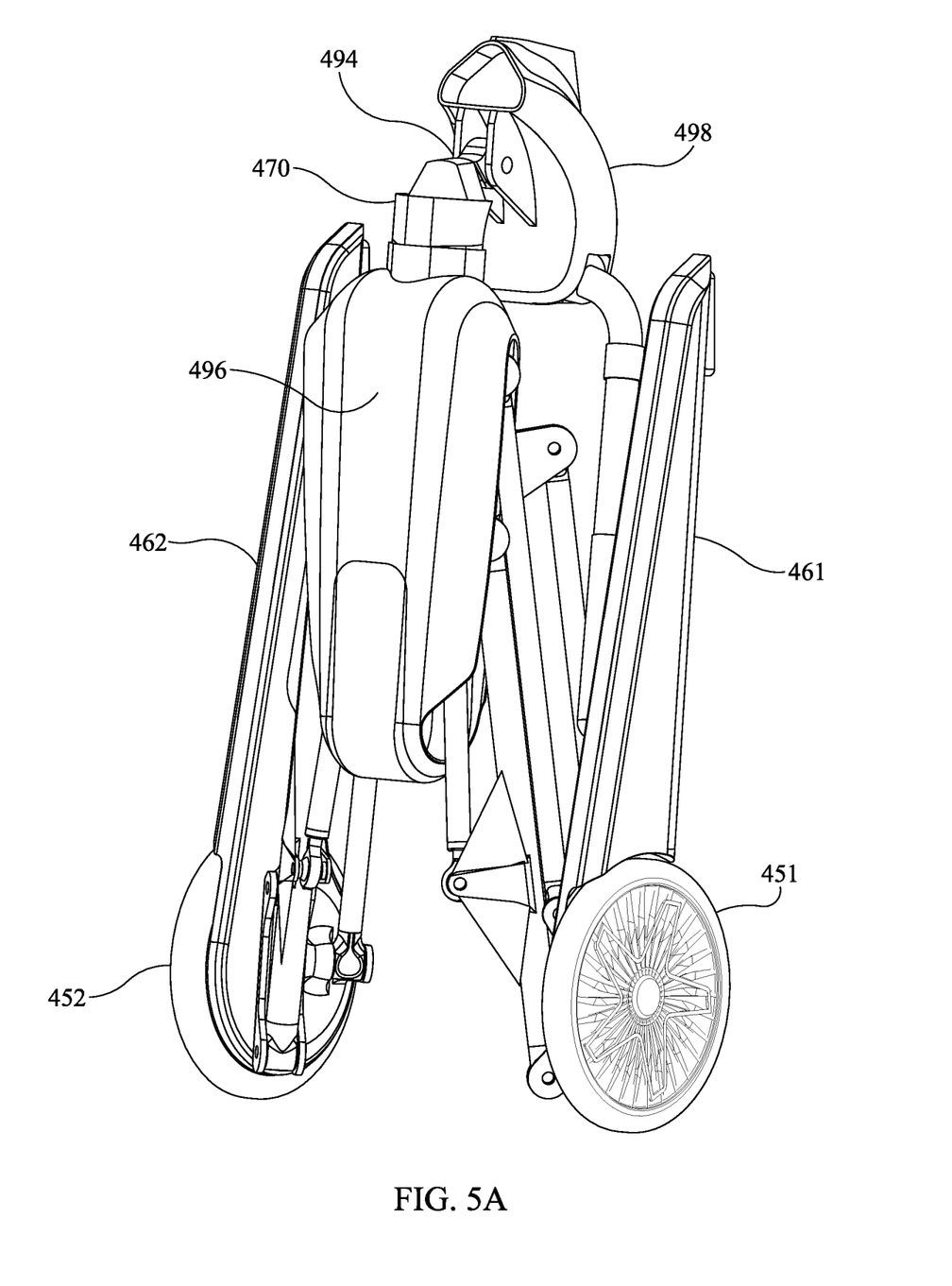
FIG. 5A is a representation of a walker of FIG. 4 in a first collapsed position.
Figure 5B:
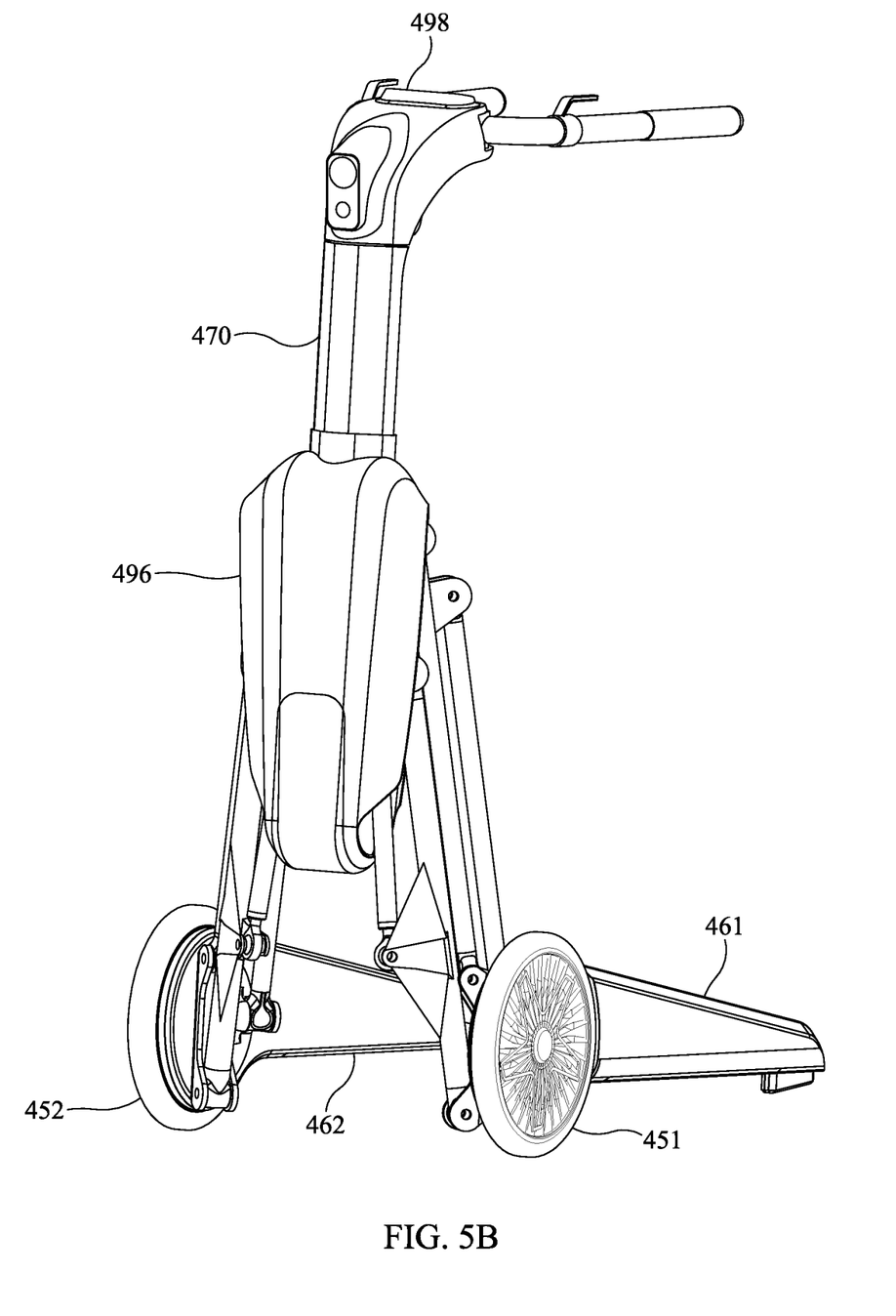
FIG. 5B is a representation of a walker of FIG. 5A in a first open position.
Figure 5C:
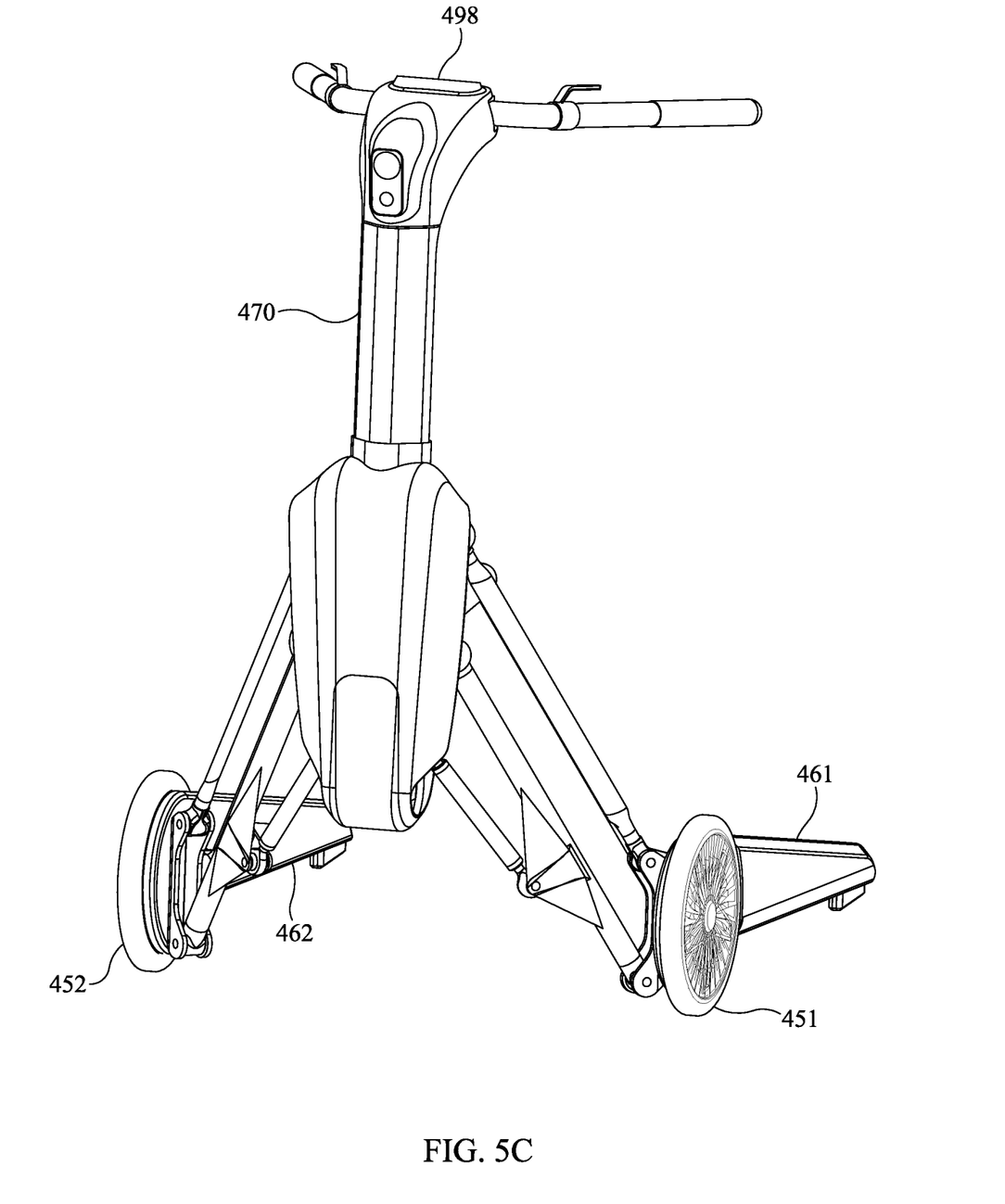
FIG. 5C is a representation of a walker of FIG. 5B in a second open position.

FIGS. 5A, 5B, and 5C show an embodiment of the present invention in three configurations. In FIG. 5A, the walker is collapsed and thus at its most compact. The handles and digital display 498 are oriented substantially parallel to vertical member 470. In order to cause the handles and digital display to be substantially parallel the vertical member that have be actuated or pivoted around a handlebar pivot mechanism 494. The tube of the vertical member 470 has been telescoped within a housing 496.

The first extension element 461 and the second extension element 462, which are part of the device are also positioned substantially perpendicular vertical member.

Moving from FIG. 5A to FIG. 5B, (from the storage to the in use state) vertical element moves from substantially parallel to substantially perpendicular to the first extension element 461 and the second extension element 462. Additionally, the handles and digital display 498 have been moved from substantially parallel to the vertical member 470 to substantially perpendicular to the vertical member, which has been extended from the housing 496.

Moving from FIG. 5B to FIG. 5C, (from a narrow to wide state) the first extension element 461 and the second extension element 462 are in the same position relative to the first wheel 451 and second wheel 452. Similarly, the handles and digital display 498 remain substantially perpendicular to the vertical member 470, which remains extended from the housing 496. However, the distance between the first extension element 461 and the second extension element 462 is greater in FIG. 5C than it was in FIG. 5B.

In some embodiments, one may collapse the device by pulling element 420, which causes elements 481, 482, 491, and 492 of the connector system to move inward and upward. The extension elements 461 and 462 do not rotate around the wheels, but after the connector system has moved inward, the vertical element and the assembly associated with it rotates toward 461 and 462. Optionally, the device contains a cam action lock or other type of lock for maintaining the device in an open (in use) or collapsed position.

Uses

The walkers of the present invention may be used in a variety of settings. Because these walkers are versatile, they may be used in all circumstances in which commonly known walkers are used. Additionally, because they are adjustable in width, a person may use them in settings in which there is limited space such as the aisle of a plane or train or in a narrow or congested hallway or room.

According to one embodiment, the present invention is directed to a method for using a walker of the present invention. The method comprises forward movement while engaging the walker. In some embodiments, the user adjusts the width of the walker while standing. In some embodiments, the user adjusts the width of the walker while moving.

In some embodiments, the user adjusts the height of the walker while standing. In some embodiments, the user adjusts the height of the walker while moving.

In some embodiments, the user collapses the walker to a storage configuration. In some embodiments, the user first narrows the width of the walker while the walker is in an in use mode, i.e., the legs or extension members have not been collapsed or folded, and then collapses, folds, or engages or otherwise activated the pivot mechanisms in order to transform the walkers into their more compact states. If there is a handlebar system, that system may, also be collapsed, folded, or otherwise moved through activation of the applicable pivot mechanism in order to render the device more compact.

Additional Features

Various devices of the present invention may be equipped with additional features. In some embodiments, the devices comprise an electric motor. When a device has one pair of wheels, the electric motor may be configured to drive those wheels. When the device contains more than one pair of wheels, the electric motor may be designed to drive only the front wheels, only the rear wheels, or all wheels. Further, the device may be designed such that the electric motor is equipped with regenerative braking. Regenerative braking causes the device to break when a user moves downhill or moves downhill at a greater than predetermined speed.

In some embodiments, the devices further comprise biometric sensors on, for example, the handles, the output of which may be visible on a user interface on the device itself and/or on a user's smartphone. Additionally or alternatively, the devices may be equipped with a sensor that determines whether the device is properly oriented or it has begun to tip over.

In some embodiments, the device comprises circuitry that allows for global positioning satellite (GPS) tracking. Additionally or alternatively, the devices comprise circuitry that measures the distance travelled or number of steps taken by a user. All of the aforementioned information, if collected, may be reported to a user interface on the device, a user's smartphone, or a third party who is remote, or a combination thereof.

We claim:

1. A walker comprising
   (a) a vertical member,
   (b) a first wheel,
   (c) a second wheel,
   (d) handles,
   (e) a first connector system, wherein the first connector system connects the first wheel and the vertical member,
   (f) a second connector system, wherein the second connector system connects the second wheel and the vertical member,
   (g) a height adjustment system, wherein the height adjustment system is capable of causing the vertical member to move between a plurality of vertical positions, and
   (h) a width adjustment system, wherein the width adjustment system is capable of causing a distance between the first wheel and the second wheel to be changed by moving the first wheel and the second wheel between a plurality of positions,
   wherein the width adjustment system comprises a width adjustment Bowden cable.

2. The walker of claim 1 further comprising a first extension element and a second extension element, wherein the first extension element is connected to the first wheel at a first end of the first extension element and a second end of the first extension element extends rearward when the device is in use, and wherein the second extension element is connected to the second wheel at a first end of the second extension element and a second end of the second extension element extends rearward when the device is in use.

3. The walker of claim 1, wherein the width adjustment system further comprises a width actuator, and wherein the width actuator is located on the handles.

4. The walker of claim 1, wherein the width adjustment system further comprises a width adjustment grab handle, wherein the width adjustment grab handle is located on the vertical member.

5. The walker of claim 4, wherein the width adjustment system further comprises a width adjustment gas strut.

6. The walker of claim 1, wherein the width adjustment system further comprises a width adjustment foot pad.

7. The walker of claim 1 further comprising a pedometer.

8. A walker comprising
   (a) a vertical member,
   (b) a first wheel,
   (c) a second wheel,
   (d) handles,
   (e) a first connector system, wherein the first connector system connects the first wheel and the vertical member,
   (f) a second connector system, wherein the second connector system connects the second wheel and the vertical member,
   (g) a height adjustment system, wherein the height adjustment system is capable of causing the vertical member to move between a plurality of vertical positions, and
   (h) a width adjustment system, wherein the width adjustment system is capable of causing a distance between the first wheel and the second wheel to be changed by moving the first wheel and the second wheel between a plurality of positions,
   wherein the height adjustment system comprises a height adjustment Bowden cable.

9. The walker of claim 8, wherein the height adjustment system further comprises a height adjustment gas strut.

10. The walker of claim 9, wherein the height adjustment system further comprises a height actuator, and the height actuator is located on the handles.

11. The walker of claim 8 further comprising a digital display, wherein the digital display is located on the handles.

12. The walker of claim 11 further comprising a pedometer.

13. A walker comprising
   (a) a vertical member,
   (b) a first wheel, (c) a second wheel,
(d) handles,
(e) a first connector system, wherein the first connector system connects the first wheel and the vertical member,
(f) a second connector system, wherein the second connector system connects the second wheel and the vertical member,
(g) a height adjustment system, wherein the height adjustment system is capable of causing the vertical member to move between a plurality of vertical positions,
(h) a width adjustment system, wherein the width adjustment system is capable of causing a distance between the first wheel and the second wheel to be changed by moving the first wheel and the second wheel between a plurality of positions; and
(i) a sensor, wherein the sensor is capable of detecting the width of a space.

14. The walker of claim 13 further comprising mechanical means for adjusting the walker while in use to fit within the space.

15. The walker of claim 13 further comprising electronic means for adjusting the walker while in use to fit within the space.

16. The walker of claim 15, wherein the electronic means automatically causes the walker to adjust to fit within the space.

17. The walker of claim 14, wherein the walker is collapsible to dimensions of 28-32 inches×13-17 inches×8-10 inches.

18. The walker of claim 1, wherein the walker is collapsible to dimensions of 28-32 inches×13-17 inches×8-10 inches.

19. The walker of claim 18 further comprising a hinge, wherein the vertical member is capable of rotating along the hinge from a first position to a second position, wherein the first position is an in use position and the second position is a collapsed position.

20. The walker of claim 19 further comprising a first extension element and a second extension element, wherein the first extension element is connected to the first wheel at a first end of the first extension element and a second end of the first extension element extends rearward when the device is in use, and wherein the second extension element is connected to the second wheel at a first end of the second extension element and a second end of the second extension element extends rearward when the device is in use and wherein when the walker is use the first extension element and the second extension element are substantially perpendicular to the vertical element and when the walker is in the collapsed position each of the first extension element and the second extension element is substantially parallel to the vertical element.

* * * * *